(12) United States Patent
Kira et al.

(10) Patent No.: US 11,268,876 B2
(45) Date of Patent: Mar. 8, 2022

(54) APPARATUS FOR VALVE-SEAT INSPECTION AND PRESSURE-RESISTANCE INSPECTION FOR VALVES, AND VALVE

(71) Applicant: KITZ CORPORATION, Chiba (JP)

(72) Inventors: Naoki Kira, Hokuto (JP); Masatake Nakashinden, Hokuto (JP)

(73) Assignee: KITZ CORPORATION, Chiba (JP)

(*) Notice: Subject to any disclaimer, the term of this patent is extended or adjusted under 35 U.S.C. 154(b) by 113 days.

(21) Appl. No.: 16/624,180

(22) PCT Filed: Jun. 28, 2018

(86) PCT No.: PCT/JP2018/024726
§ 371 (c)(1),
(2) Date: Dec. 18, 2019

(87) PCT Pub. No.: WO2019/004401
PCT Pub. Date: Jan. 3, 2019

(65) Prior Publication Data
US 2020/0109999 A1   Apr. 9, 2020

(30) Foreign Application Priority Data

Jun. 30, 2017  (JP) .............................. JP2017-129795

(51) Int. Cl.
*G01M 3/22*   (2006.01)
(52) U.S. Cl.
CPC ................... *G01M 3/224* (2013.01)
(58) Field of Classification Search
CPC ..................... G01M 3/224; G01M 3/2876
See application file for complete search history.

(56) References Cited

U.S. PATENT DOCUMENTS 3,088,312 A * 5/1963 Morris ............... G01M 3/2876
                                                              73/46
3,530,708 A * 9/1970 Marandjeany ...... G01M 3/2876
                                                              73/46
(Continued)

FOREIGN PATENT DOCUMENTS

CN      1967183        5/2007
JP      4-309836       11/1992
(Continued)

OTHER PUBLICATIONS

International Search Report dated Aug. 7, 2018 in International (PCT) Application No. PCT/JP2018/024726.
(Continued)

*Primary Examiner* — Natalie Huls
(74) *Attorney, Agent, or Firm* — Wenderoth, Lind & Ponack, L.L.P.

(57) ABSTRACT

An apparatus for valve-seat inspection and pressure-resistance inspection for valves which can successively perform a valve-seat inspection and a pressure-resistance inspection on a valve and can quickly and correctly inspect valves, by highly-accurately detecting a leak of search gas in a substantially fixed time; a method for these inspections; and a valve. The apparatus allows a valve-seat leak and pressure-resistance inspection of a test valve, includes a clamp mounting mechanism that fixes the test valve in an inspection chamber, an inspection space adjustment mechanism that adjusts a volumetric capacity of an inspection space S of the chamber, and a gas sensor for valve-seat inspection arranged in a flow path of the test valve and a gas sensor provided in the chamber for a pressure-resistance inspection of the valve, in which the volumetric capacity of the inspection space S of the chamber is adjusted to be substantially fixed.

8 Claims, 11 Drawing Sheets

(56) References Cited

U.S. PATENT DOCUMENTS

| | | | | |
|---|---|---|---|---|
| 3,727,453 | A * | 4/1973 | Rees | B60T 17/228 |
| | | | | 73/39 |
| 4,682,495 | A * | 7/1987 | McNeely | F16K 37/0091 |
| | | | | 116/277 |
| 5,275,036 | A * | 1/1994 | Schulz | F16K 17/04 |
| | | | | 73/1.69 |
| 5,801,298 | A | 9/1998 | Anderson | |
| 2004/0129054 | A1 * | 7/2004 | Hyme | F16K 37/0091 |
| | | | | 73/1.72 |
| 2007/0119237 | A1 | 5/2007 | Kanematsu et al. | |
| 2009/0100909 | A1 | 4/2009 | Grosse Bley et al. | |
| 2019/0302045 | A1 * | 10/2019 | Uematsu | G01M 3/02 |
| 2021/0011500 | A1 * | 1/2021 | Halimi | F16K 31/042 |
| 2021/0025778 | A1 * | 1/2021 | Ikegami | G01M 3/224 |

FOREIGN PATENT DOCUMENTS

| | | |
|---|---|---|
| JP | 3201667 | 8/2001 |
| JP | 2007-139456 | 6/2007 |
| JP | 2008-513799 | 5/2008 |
| JP | 2012-047651 | 3/2012 |
| JP | 2016-148525 | 8/2016 |
| JP | 2017-090155 | 5/2017 |
| JP | 2017-90155 | 5/2017 |

OTHER PUBLICATIONS

JIS B 2003: 2013 (JVMA), General Rules for Inspection of Valves, <URL:http://kikakurui.com/b2/B2003-2013-01.html>, pp. 1, 4-6, Jul. 20, 2018.

* cited by examiner

Fig. 8

| SAMPLE VALVE SPECIFICATIONS | ITEM NAME : | 10α | |
|---|---|---|---|
| | VALVE TYPE : | GLOBE VALVE | |
| | NOMINAL PRESSURE : | 10 K | |
| | NOMINAL DIAMETER : | 1／2 | |
| INSPECTION SPACE ADJUSTMENT MECHANISM | CLAMP MOUNTING MECHANISM | PLACEMENT JIGS | FACE-TO-FACE SPACING 65 mm |
| | | ELEVATING TABLE | HEIGHT x mm |
| | | HEXAGONAL DIAMETER | 30 mm |
| | MOVABLE CLAMP JIG | MOVEMENT AMOUNT | y mm |
| | | PRESSURIZING FORCE | F N-m |
| INSPECTION CONDITIONS | VALVE-SEAT INSPECTION | INSPECTION PRESSURE | 0.6MPa |
| | | INSPECTION TIME | 15sec |
| | PRESSURE-RESISTANCE INSPECTION | INSPECTION PRESSURE | 1.4MPa |
| | | INSPECTION TIME | 15sec |
| OTHERS | NUT RUNNER | TIP BIT | TYPE A |

Fig. 9

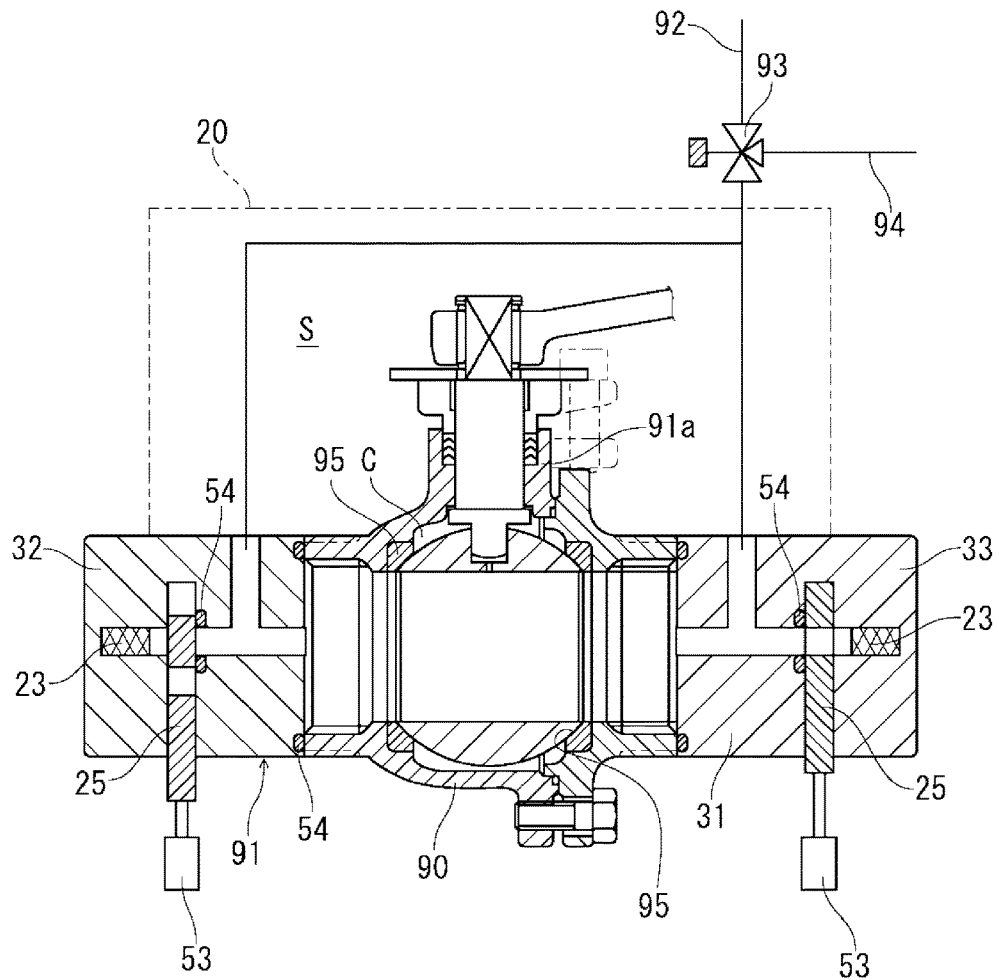

APPARATUS FOR VALVE-SEAT INSPECTION AND PRESSURE-RESISTANCE INSPECTION FOR VALVES, AND VALVE

BACKGROUND OF THE INVENTION

1. Technical Field

The present invention relates to apparatuses for valve-seat inspection and pressure-resistance inspection for various valves, for example, globe valves, gate valves, and ball valves, and valves and, in particular, to an inspection apparatus, and valve suitable when a valve-seat inspection and a pressure-resistance invention are successively performed.

2. Description of the Related Art

Conventionally, a valve after manufacture undergoes a valve-seat inspection (valve-seat leak test: seat test) for checking the presence or absence of a leak from a valve seat and a pressure inspection such as a pressure-resistance inspection (valve-box pressure-resistance test: shell test) for checking the strength and the presence or absence of a leak in a pressure-resistant part, and the valve before shipping is inspected by these inspections. In this case, an inspection method of successively performing these inspections has been known.

For example, in Japanese Patent No. 3201667, a technique is disclosed in which, following a low-pressure seat leak test and a high-pressure seat leak test (valve-seat inspection), a check valve undergoes an airtightness test (pressure-resistance inspection). In this test apparatus for check valves, a check valve to be inspected is accommodated in an airtight test box as a metal-made, pressure-resistant, closed container, and helium gas is used as test search gas. In flow paths on primary and secondary sides of the airtight test box, a primary pressure gauge and a secondary pressure gauge are arranged, respectively. In the valve-seat inspection and the pressure-resistance inspection, pressure values of the search gas are measured by these primary and secondary pressure gauges.

In this inspection apparatus, for reasons such as cost reduction, hydrogen gas may be used as search gas. For example, in Japanese Patent Application Laid-Open No. 2012-47651, a subject to be inspected (work) such as a heat exchanger of an air conditioner is accommodated in a hood, and mixed gas of hydrogen gas and nitrogen gas is used as search gas for a leak test of this work. In this leak detection apparatus, a vacuum pump for evacuation is provided to plumbing connected to the hood, and a gas sensor is provided between a discharge port of this vacuum pump and a delivery valve provided to a discharge side of this discharge port.

SUMMARY OF THE INVENTION

1. Technical Problem

In the former inspection apparatus as in JP 3201667, the volumetric capacity of the airtight test box is often set in advance at a predetermined size. That is, in relation to evacuation performed for the purpose of highly-accurate detection, there is no idea of changing the volumetric capacity of the airtight test box, to begin with. Consider a case in which the airtight test box has a predetermined size. When valves of different classes or sizes due to differences in type, nominal pressure, and so forth of the valves are successively inspected, if, for example, the test box set so as to correspond to a valve of large bore in accordance with the nominal pressure is shared to be used for a valve of small bore with a different nominal pressure, the space for inspection inside the test box is relatively widened by the decreased volume of the valve. Thus, more time is required for a sensor to detect helium gas leaking from the valve and diffused into the test box, thereby increasing the time required for inspection. Since it is required to produce a large amount of small-volume valves and so forth, protraction of the detection time leads to a decrease in production capacity. From this, the time for detecting search gas is varied with different types, classes, sizes, and so forth of the valves, thereby making it difficult to correctly detect a leak at the time of pressure-resistance inspection.

Also, since the airtight test is performed after the hermetically-sealed airtight test box in the inspection apparatus of JP 3201667 is evacuated by a vacuum pump of a helium leak detector, a facility for hermetical sealing is required. Furthermore, evacuation time has to be also considered, the time required for the entire inspection is long.

If a solid state type gas sensor is used as a sensor for pressure detection in search gas, when a large amount of search gas is applied to this gas sensor to abruptly increase pressure, a phenomenon, so called poisoning, may occur to degrade the sensitivity of the sensor and cause a damage. In particular, if the solid state type gas sensor is arranged at a communication position of the valve seat for valve-seat inspection, in case that a large leak occurs at the time of inspection, a serious damage may occur in the sensor, and a leak of search gas may not be correctly detectable due to the above-mentioned poisoning.

This inspection apparatus is for check valves in which sealing is made by a valve seat at one location, and no method is disclosed for detecting a leak when valve seats are provided on primary and secondary sides across a valve body such as a ball valve.

On the other hand, in JP 2012-47651, the apparatus is a merely apparatus only for a leak test (valve-seat inspection), and it is impossible to successively perform a valve-seat inspection and then a pressure-resistance inspection in this apparatus. Moreover, in this apparatus, while evacuation is performed by the vacuum pump, a leak in the plumbing is detected by the gas sensor. Thus, the solid state type gas sensor is more fiercely worn out by poisoning.

The present invention was developed to solve the conventional problems, and has an object to provide an apparatus for valve-seat inspection and pressure-resistance inspection for valves which can successively perform a valve-seat inspection and a pressure-resistance inspection on a valve and can quickly and correctly inspect valves, even if they are of different types, classes, and sizes, by highly-accurately detecting a leak of search gas in a substantially fixed time, and a valve.

2. Solution to the Problem

To achieve the above-described object, the invention is directed to an apparatus for valve-seat inspection and pressure-resistance inspection for valves allowing a valve-seat leak and pressure-resistance inspection of a test valve, the apparatus having a fixed clamp jig for fixing one side of the test valve and a movable clamp jig for fixing another side of the test valve while moving, the apparatus provided with a cover part for covering the test valve with an open lower side, in which a plurality of gas sensors are fixedly attached inside this cover part, the fixed clamp jig and the cover part configure a chamber in a non-hermetically-sealed state in a state in which the cover part is moved to a fixed clamp side, the movable clamp is inserted into an inspection chamber in accordance with a volume of the test valve, it is provided that a volumetric capacity of an inspection space of the chamber is adjusted to be substantially fixed by an insertion depth of the movable clamp and the volume of the test valve in accordance with the volume of the test valve, the inspection space of the test valve is provided inside this chamber in the non-hermetically-sealed state, and search gas diffuses in the cover part with the test valve being in the non-hermetically-sealed state separated from outside.

The invention according to a second aspect is directed to the apparatus for valve-seat inspection and pressure-resistance inspection for valves, in which a mounting table is provided on a lower side of the chamber, and the volumetric capacity of the inspection space of the chamber is adjusted by this mounting table ascending and descending.

The invention according to a third aspect is directed to the apparatus for valve-seat inspection and pressure-resistance inspection for valves, including a shutdown mechanism for shutting a flow path to a gas sensor down at the valve-seat inspection until supply of an inspection pressure is completed, the gas sensor provided to a secondary flow path of the test valve.

The invention according to a fourth aspect is directed to the apparatus for valve-seat inspection and pressure-resistance inspection for valves, in which the test valve is a valve including a glove valve or a gate valve.

The invention according to a fifth aspect is directed to the apparatus for valve-seat inspection and pressure-resistance inspection for valves, in which the search gas is a mixed gas of hydrogen and nitrogen formed of a gas containing hydrogen.

The invention according to a sixth aspect is directed to the apparatus for valve-seat inspection and pressure-resistance inspection for valves, wherein when the test valve is a ball valve, the search gas is injected with an intermediate degree of opening and the search gas is charged into a cavity with the valve being in a full-close state and, in preparation for the valve-seat inspection, the search gas in primary and secondary plumbing of the ball valve is exhausted.

The invention according to a seventh aspect is directed to a valve inspected by the apparatus for valve-seat inspection and pressure-resistance inspection for valves.

3. Advantageous Effects of the Invention

According to the present invention, a valve-seat inspection and a pressure-resistance inspection of a valve can be successively performed. Even with valves of different types, classes, and sizes due to nominal pressures an so forth, by holding the test valve at an inspectable correct position and adjusting the volumetric capacity of the inspection space in the chamber so that the volumetric capacity is substantially fixed, after the valve-seat inspection is performed, search gas is diffused in the chamber in a state in which an influence such as external wind is prevented to perform the pressure-resistance inspection, and a leak of the search gas can be detected with high accuracy in a substantially fixed time. With this, a valve-seat inspection and a pressure-resistance inspection can be quickly and correctly performed on a small amount of test valves of various types.

Furthermore, the mounting table also serves as a component for attaching the test valve to the inspection apparatus. Thus, an inspection apparatus with a minimum structure and a substantially fixed inspection time can be provided.

At the time of valve-seat inspection, by providing the sensor at a position near the inspection space, valve-seat inspection can be performed quickly and correctly. Here, the gas sensor for valve-seat inspection on the secondary flow path of the test valve is protected by the shutdown mechanism until supply of an inspection pressure is completed, thereby preventing an abrupt pressure from being applied to this gas sensor. Thus, even in case that a large leak occurs from the valve seat, a significant voltage drop and damage of the gas sensor are prevented. When a solid state type gas sensor is used as a gas sensor, poisoning is prevented and a decrease in sensitivity and damage of the sensor can be prevented. By this solid state type gas sensor, sensing can be made with high sensitivity even in the case of low-concentration search gas, and long-life inspection excellent in stability can be performed.

Valves including a globe valve and a gate valve can be used as a test valve. Even if the types, classes, and sizes of these are varied, a valve-seat inspection and a pressure-resistance inspection can be performed quickly with a simple structure and high accuracy, and the valve-seat inspection and the pressure-resistance inspection can be successively performed on these valves of different specifications to achieve inspection automation.

With the search gas being a mixed gas of hydrogen and nitrogen formed of a gas containing hydrogen, the valve-seat inspection and the pressure-resistance inspection can be quickly performed by using diffusibility of hydrogen. It is possible to improve a property of retaining hydrogen around the test valve at the time of an occurrence of an external leak. By using a hydrogen sensor, even a slight external leak can be detected safely and correctly.

Even in a ball valve with valve seats provided at two locations on primary and secondary sides, the valve-seat inspection and the pressure-resistance inspection can be performed on each valve-seat seal side. In this case, after the search gas is injected with an intermediate degree of opening, the valve is set to be in a full-open state to charge the search gas to the cavity and then, the search gas in the primary and secondary plumbing of the ball valve is exhausted to allow the valve-seat inspection. At the time of this valve-seat inspection, the presence or absence of a valve-seat leak can be correctly inspected by each of the gas sensors provided on the primary and secondary sides.

By performing inspection by the above-described apparatus for valve-seat inspection and pressure-resistance inspection, a valve with a reduced valve-seat leak and excellent in pressure resistance can be provided.

BRIEF DESCRIPTION OF THE DRAWINGS

FIG. 8 is a table depicting one example of a table.

FIG. 9 is a schematic longitudinal sectional view depicting a first embodiment of the apparatus for valve-seat inspection and pressure-resistance inspection for valves of the present invention.

DETAILED DESCRIPTION OF THE EMBODIMENTS

In the following, the apparatus for valve-seat inspection and pressure-resistance inspection for valves in the present invention is described in detail based on embodiments.

Figure 1:
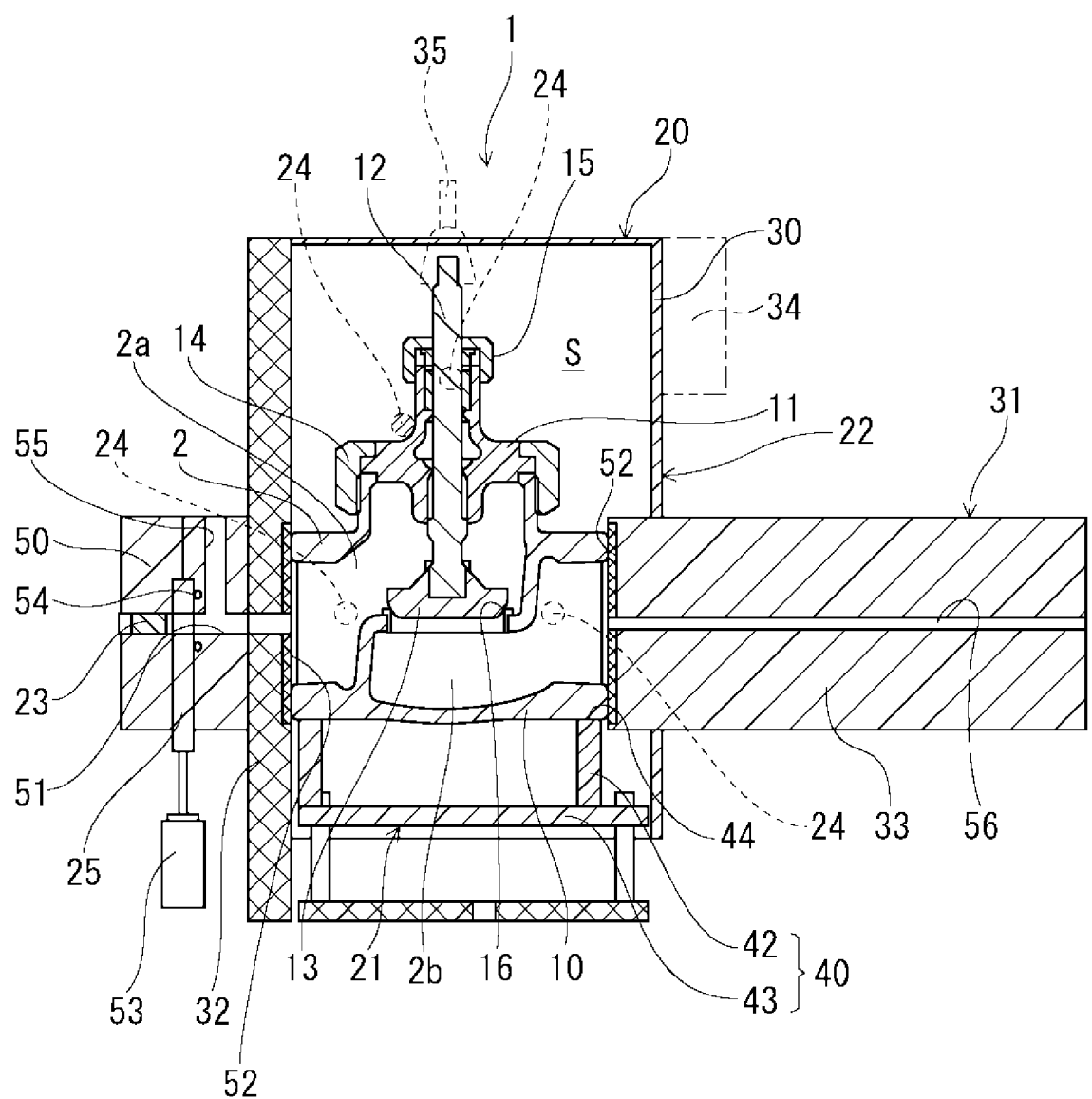
FIG. 1 is a schematic longitudinal sectional view depicting a first embodiment of an apparatus for valve-seat inspection and pressure-resistance inspection for valves of the present invention.
Figure 2:
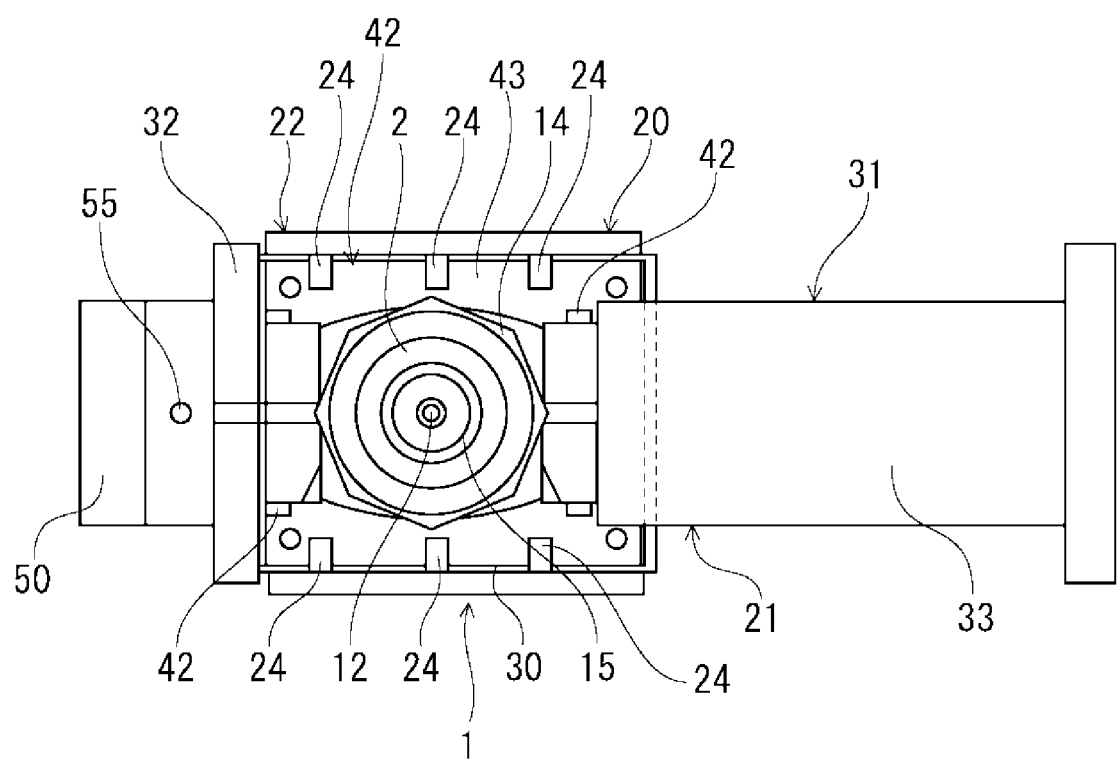
FIG. 2 is a plan view of FIG. 1.
Figure 3:
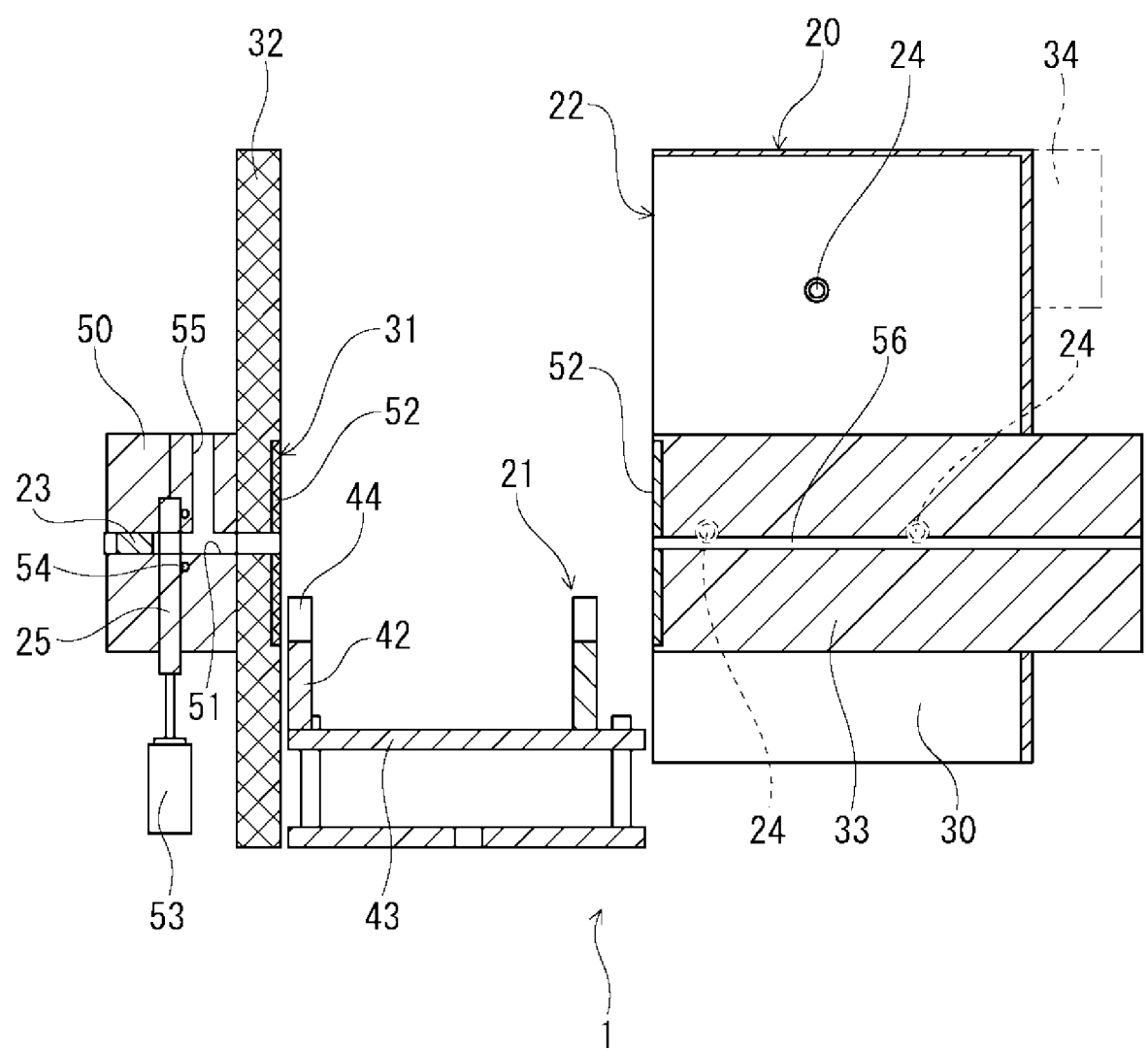
FIG. 3 is a schematic longitudinal sectional view of the apparatus for valve-seat inspection and pressure-resistance inspection for valves before valve attachment.

Depicted in FIG. 1 is a schematic longitudinal sectional view depicting a first embodiment of the apparatus for valve-seat inspection and pressure-resistance inspection for valves of the present invention in a state in which a test valve is attached. FIG. 2 depicts a plan view of FIG. 1, and FIG. 3 depicts a schematic longitudinal sectional view of the apparatus for valve-seat inspection and pressure-resistance inspection for valves before valve attachment.

The apparatus for valve-seat inspection and pressure-resistance inspection for valves (hereinafter referred to as an apparatus main body 1) of the present invention supplies search gas to a test valve 2, which is a subject to be inspected, to allow a valve-seat inspection (valve-seat leak inspection) and a pressure-resistance inspection to be performed on this test valve 2.

In FIG. 1, the test valve 2 to be inspected in the apparatus main body 1 is, for example, a globe valve, a gate valve, or a valve including a ball valve. In the present embodiment, a globe valve depicted in the drawing is used as the test valve 2. The globe valve 2 has a body part 10 and a gland part 11. In a state a stem 12 and a disk 13 are incorporated into these, cap-nut-shaped nut members 14 and 15 are screwed for integration all together. The stem 12 is attached by screwing to the gland part 11 so as to be freely ascend and descend. The disk 13 fixed to a tip part of this stem 12 makes contact with and goes away from a valve seat 16 provided inside the body part 10 to open and close a flow path. The test valve 2 in the present embodiment is provided with a female screw not depicted as a part for connecting both sides. This connecting part may be a male screw or may have a flange shape.

For the above-described test valve 2, for example, gas containing hydrogen is used as search gas supplied at the time of valve-seat inspection and pressure-resistance inspection, in particular, mixed gas containing 5% hydrogen as diffusive gas and 95% nitrogen as inert gas is used. This mixed gas has a property of leaking out from the valve seat 16 to the secondary side when a leak from the valve seat 16 is present at the time of valve-seat inspection and leaking out from a portion near a connecting part between the body part 10 and the gland part 11 or screw parts of the nut members 14 and 15 when an external leak is present at the time of pressure-resistance test.

The mixed gas of 5% hydrogen and 95% nitrogen as search gas is nonflammable high-pressure gas, and can thus be used safely. The search gas may be gas other than gas containing hydrogen, and any of various gases such as, for example, helium gas and methane gas, can be used. When helium gas is used as search gas, as with the mixed gas containing hydrogen, diffusibility is high.

In FIG. 1 to FIG. 4, the apparatus main body 1 has an inspection chamber 20, a clamp mounting mechanism 21, an inspection space adjustment mechanism 22, a gas sensor for valve-seat inspection 23, gas sensors for pressure-resistance inspection 24, and a shutdown mechanism 25. By using the apparatus main body 1, a valve-seat inspection and a pressure-resistance inspection of the above-described test valve 2 are performed. As a size of the test valve 2 undergoing the valve-seat inspection and the pressure-resistance inspection, for example, ¼B to 2B is assumed. FIG. 1 depicts an example of a test valve having a nominal pressure of 16 K and a nominal diameter of 2B. In the present embodiment, the chamber 20, the clamp mounting mechanism 21, and so forth configuring the apparatus main body 1 are used in common even for the test valves 2 of different types, classes, and sizes.

The chamber 20 has a cover part 30 in a substantially rectangular parallelepiped shape having a size capable of accommodating the test valve 2 therein, and is configured of this cover part 30 and a fixed clamp jig 32 of a clamp 31, which will be described further below, to be able to accommodate the test valve 2. Inside the chamber 20, an inspection space S for the test valve 2 is provided. This inspection space S is in a state of being isolated from outside. The "state of being isolated from outside" in the present invention does not mean that the inside of the chamber 20 is in a hermetically-sealed state but means that an influence such as external wind is prevented from being exerted on the test valve 2 and a state in which a flow of a gaseous body is permitted in the chamber 20 to the extent that hydrogen leaking from the test valve 2 reaches a sensor 24 within an inspection time. The clamp 31 includes the fixed clamp jig 32 and a movable clamp jig 33.

The "inspection space S" in the present embodiment is a space surrounded by the chamber 20 configured of the cover part 30 and the fixed clamp jig 32 and an elevating table 43 of a mounting table 40 except the test valve 2 and the movable clamp jig 33, a space where search gas is diffusible.

At appropriate positions on both side surfaces inside the cover part 30, the gas sensors for pressure-resistance inspection 24 are provided. By these gas sensors for pressure-resistance inspection 24, a leak of the search gas from the test valve 2 in the chamber 20 can be detected from both sides. In the present embodiment, six gas sensors for pressure-resistance inspection 24 are provided in total on both sides, three for each side in the cover part 30. In this case, four sensors are disposed in total on both sides near flow paths on the primary and secondary sides of the test valve 2, and two sensors are disposed in total on both sides near an upper part of the gland part 11. In this manner, by using six gas sensors for pressure-resistance inspection 24, detection capacity is improved, also leading to a reduction in detection time and automation.

In the present embodiment, the number, attachment positions, and heights of the gas sensors 24 are common even for the test valves 2 of different types, classes, or sizes. The number, attachment positions, and heights of the gas sensors 24 can be changed as appropriate in accordance with the size, shape, and so forth of the test valve 2 as a target, and an appropriate pressure-resistance inspection can be performed in accordance with various test valves.

An exhaust fan 34 indicated by a two-dot-chain line is provided to the chamber 20. By this exhaust fan 34, residual hydrogen gas in the inspection space S of the chamber 20 can be discharged to outside. Above the chamber 20, a valve open/close operator (nut runner) 35 is provided. To a bit (component) attached to a tip of this nut runner 35, an upper end of the stem 12 of the test valve 2 is connected. With rotation of the nut runner 35, the disk 13 is provided so as to be opened and closed. In the present embodiment, the tip bit of the nut runner 35 can be selected from several types in accordance with the shape and size of the stem 12 of the test valve 2.

The clamp mounting mechanism 21 is formed of the mounting table 40 and the clamp 31 for fixing the test valve 2 in the chamber 20. The mounting table 40 has placement jigs 42 for mounting the test valve 2 and the elevating table 43 capable of moving the test valve 2 up and down in the chamber 20.

Figure 4A:
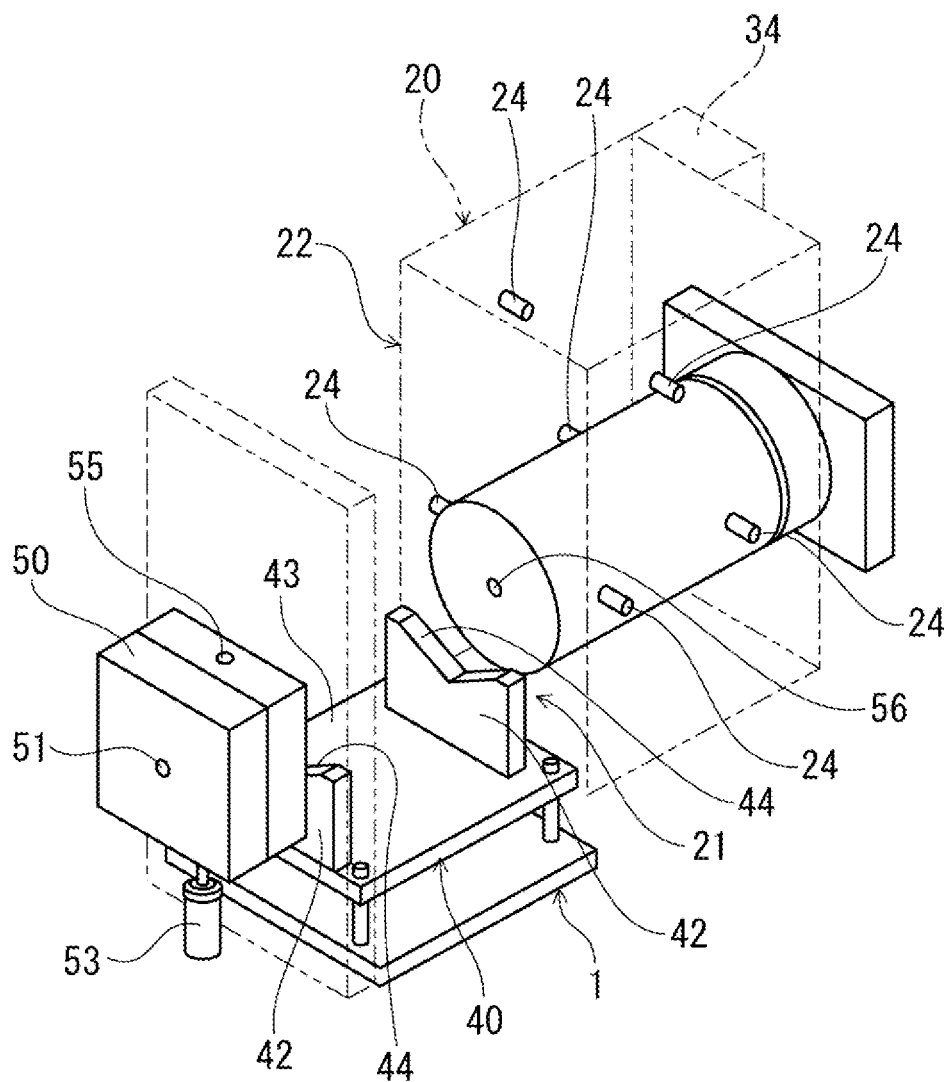
In FIG. 4($a$) is a schematic perspective view of the apparatus for valve-seat inspection and pressure-resistance inspection for valves and FIG. 4($b$) is a schematic front view of a placement jig.

In FIG. 4(a), the placement jigs 42 have mounting parts 44 where both sides of the test valve 2 can be mounted and held. These mounting parts 44 are provided to each have an appropriate shape, such as a tapered shape capable of holding a valve side part formed of a polygonal shape such as a hexagon or octagon or an arc shape capable of holding a valve side part formed of a cylindrical shape. In the present embodiment, each mounting part 44 is formed in a tapered shape with a tilt angle capable of holding a hexagonal valve side part. The placement jigs 42 are attached to the elevating table 43 in a state in which a space therebetween can be adjusted in accordance with a face-to-face dimension of the test valve 2.

Figure 4B:
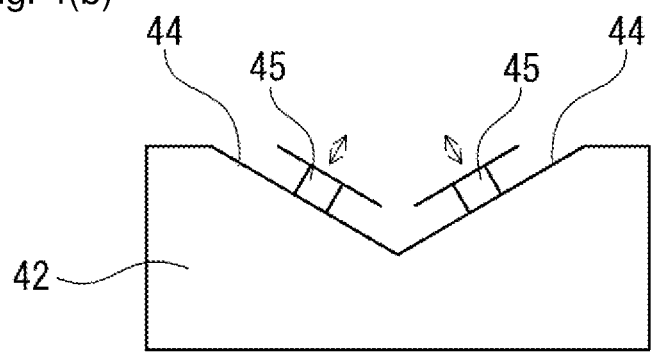

As depicted in FIG. 4(b), adjustment jigs 45 are provided to the mounting parts 44. The adjustment jigs 45 are provided so as to freely advance and retreat in arrow directions in the drawing (mounting direction). By adjusting advancement and retreat of these adjustment jigs 45, the side part of the test valve 2 of any of various sizes from small to large sizes can be held.

The elevating table 43 is provided so as to be able to ascend and descend by a cylinder or the like not depicted. By ascending and descending operation of this elevating table 43, it is possible to adjust the height direction of the test valve 2 mounted on the placement jigs 42 provided on an upper surface of the elevating table.

A space between the elevating table 43 and the chamber 20 is not required to be hermetically sealed, and an ascendable/descendable gap is formed.

On the other hand, the clamp 31 of FIG. 1 to FIG. 3 has, as described above, the fixed clamp jig 32 and the movable clamp jig 33.

The fixed clamp jig 32 is arranged in a plate shape at a position serving as a secondary side of the test valve 2 so as to form one surface of the chamber 20. This fixed clamp jig 32 and the above-described cover part 30 configure the chamber 20. To the fixed clamp jig 32, a block member 50 is integrally formed. Inside these clamp jig 32 and the block member 50, a secondary flow path 51 is formed where the search gas supplied to the test valve 2 flows. At a position opposed to a secondary flow path 2a of the test valve 2 in the fixed clamp jig 32, a seal member 52 formed of a gasket is provided. By this seal member 52, a leak from a pressure-contact portion between the fixed clamp jig 32 and the test valve 2 is prevented.

In the secondary flow path 51 in the block member 50, the gas sensor for valve-seat inspection 23 is arranged so as to communicate the flow path 2a of the test valve 2, and is provided so that a valve-seat inspection on the test valve 2 can be performed by this gas sensor for valve-seat inspection 23. Although not depicted, a flow sensor may be used in place of this gas sensor for valve-seat inspection 23.

The gas sensor for valve-seat inspection 23 and the above-described gas sensors for pressure-resistance inspection 24 are each formed of a hydrogen sensor capable of detecting hydrogen gas as search gas. By using these hydrogen sensors 23 and 24, a leak of hydrogen in the mixed gas of hydrogen and nitrogen, which is diffusive gas, can be reliably detected. All of the sensors 23 and 24 are fixed in the chamber 20 or the fixed clamp jig 32, but may be provided so that their positions can be adjusted by movement. As search gas, helium gas can be used. In this case, a gas heat-conduction-type sensor is used.

The sensors 23 and 24 are each formed of a module of outputting, with application of a predetermined voltage, a voltage in accordance with the concentration of leaking hydrogen. Before inspection, it is required to change the output voltage by a volume for resistance adjustment to finely adjust sensitivity in accordance with the warm-up state of the sensors 23 and 24 and changes in concentration of hydrogen in the atmosphere.

As the sensors 23 and 24, commercially-available solid-state-type sensors capable of outputting an analog signal (0-5 V) are used, and for example, hot-wire solid-state-type hydrogen sensors are used. These hydrogen sensors 23 and 24 are sensors using changes in electric conductivity due to absorption of hydrogen gas onto the surface of a metal-oxide semiconductor such as stannic oxide ($SnO_2$). In this case, the output voltage becomes logarithmic with respect to gas concentration, allowing highly-sensitive outputs even at low concentration.

When the plurality of sensors 23 and 24 are used, it is preferable to have a function of adjusting their reference voltage via a CPU, which will be described further below, to a certain valve. With this, sensitivities of the respective sensors 23 and 24 can be equalized to allow leaking hydrogen gas to be detected with high accuracy.

On the primary side of the sensor for valve-seat inspection 23, a shutdown mechanism 25 for protection is provided. In this example, a shutter is used as this shutdown mechanism 25. The shutter 25 is provided so as to be able to open and close the secondary flow path 51 to the gas sensor for valve-seat inspection 23 by a cylinder 53. By open/close control of this shutter 25, the secondary flow path 51 can be shut down until supply of an inspection pressure to the gas sensor for valve-seat inspection 23 is completed. On a search gas entrance side of the shutter 25, a seal member 54 formed of an O ring is provided. By this O ring 54, the shutter 25 in a shutdown state is sealed, and a leak of the search gas to the gas sensor for valve-seat inspection 23 side is prevented.

Furthermore, on the primary side of the gas sensor for valve-seat inspection 23 and the shutter 25, an exhaust pressure supply path 55 communicating the secondary flow path 51 is provided. This is provided so that residual gas in the secondary flow path 51 and the test valve 2 can be exhausted via this exhaust pressure supply path 55.

The movable clamp jig 33 is arranged on a primary side of the test valve 2, and is attached so as to be able to advance and retreat to hold the test valve 2 thereby and by the above-described fixed clamp jig 32. Inside the movable clamp jig 33, a primary flow path 56 is formed. Via this primary flow path 56, the search gas can be supplied to the test valve 2. At a position opposed to a primary flow path 2b on a test valve 2 side of the movable clamp jig 33, the seal member 52 formed of a gasket similarly to the fixed clamp jig 32 is provided. By this seal member 52, a leak from a pressure-contact portion between the movable clamp jig 33 and the test valve 2 is prevented.

The inspection space adjustment mechanism 22 is configured of the above-described movable clamp jig 33 and clamp mounting mechanism 21. By this inspection space adjustment mechanism 22, the volumetric capacity of the inspection space S in the chamber 20 can be adjusted. In this case, by causing the movable clamp jig 33 to advance or retreat to change an insertion depth into the chamber 20 or moving the elevating table 43 up and down, the size of the inspection space S in the volume inside the chamber 20 can be adjusted.

In a manner such as these, by the insertion depth of the clamp 31 into the inspection chamber 20 and the ascent or descent of the mounting table 40 into the chamber 20, the volumetric capacity of the inspection space of the chamber 20 can be adjusted to be substantially fixed. By performing adjustment of the inspection space S by the inspection space adjustment mechanism 22, the volumetric capacity of the inspection space S of the chamber 20 can be adjusted to be substantially fixed even if the types, classes, or sizes of the test valves 2 are varied. With this, the time for detecting search gas can be set to be substantially equal even for the test valves 2 of different sizes.

In the present embodiment, as specifications of the test valve 2, nominal pressures of 10 K, 16 K, and 20 K and nominal diameters of ¼ to 2 inches are assumed, and the volumetric capacity of the inspection space S is adjusted so as to have a substantially fixed value in the neighborhood of 850 cm$^3$. Specifically, in a test valve 80 of FIG. 6, which will be described further below, the volume of the space surrounded by the chamber 20 and the elevating table 43 is 1800 cm$^3$, the volume of the test valve 80 is 55 cm$^3$, and the volume of the movable clamp jig 33 is 900 cm$^3$. The volumetric capacity of the inspection space S based on these is set at 845 cm$^3$. As the substantially fixed values in the present embodiment, a range of ±5% is assumed. Specifically, when the capacity exceeds +5% of 850 cm$^3$, that is, approximately 893 cm$^3$, the time for detecting search gas is increased.

Figure 5:
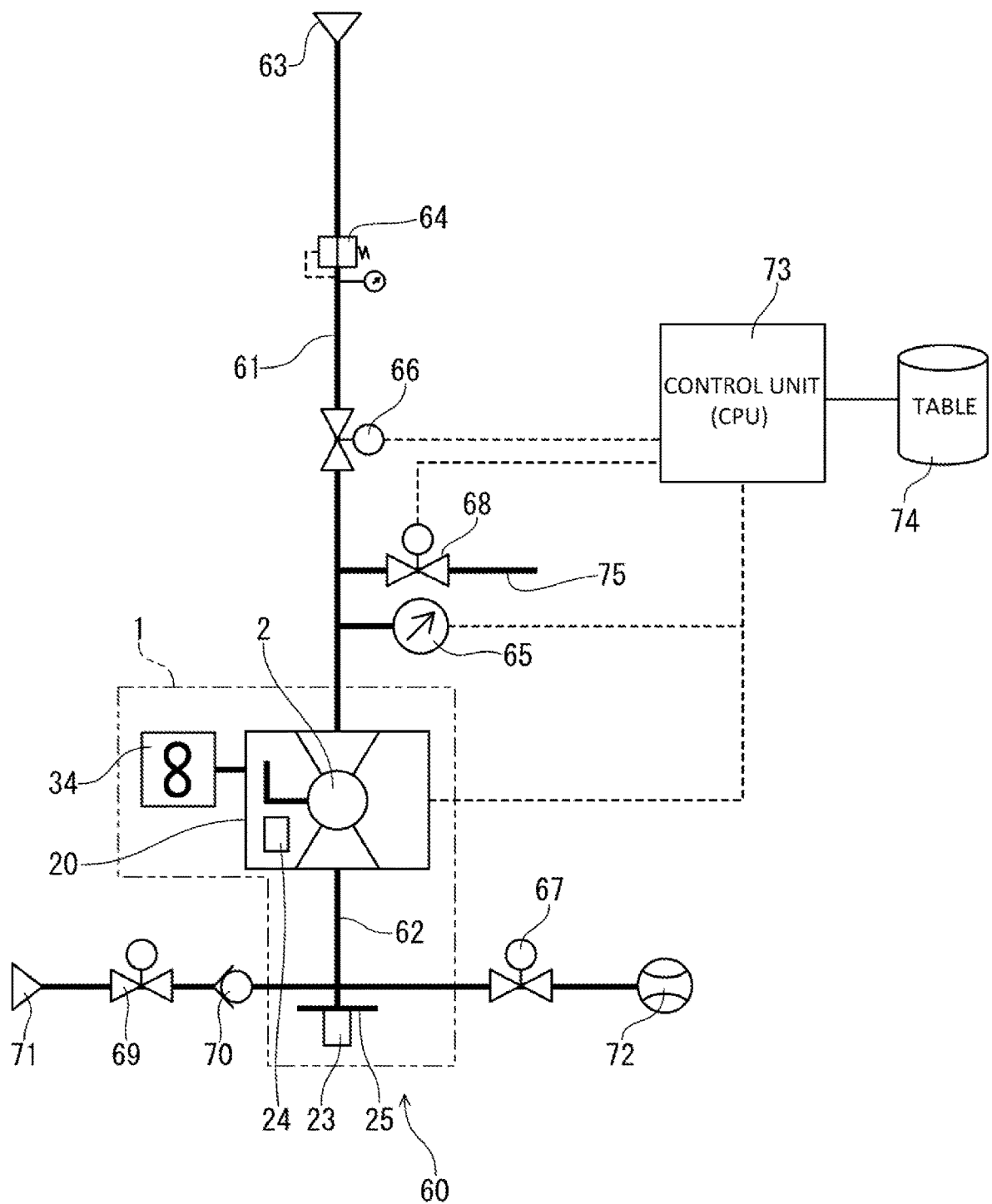
FIG. 5 is a block diagram depicting an inspection line for a globe valve.

In FIG. 5, depicted is one example of an inspection line including the apparatus main body 1 when the test valve is a globe valve. In this inspection line 60, it is assumed that a flow path from a hydrogen gas supply side to a primary side of the apparatus main body 1 is a first flow path 61 and a flow path on a secondary side of the apparatus main body 1 onward is a second flow path 62.

The inspection line 60 has, in addition to the above-described apparatus main body 1, a hydrogen gas supply source 63, a regulator 64, a pressure sensor 65, a pressurizing valve 66, an open/close valve 67, an exhaust valve 68, a ventilation valve 69, a check valve 70, a compressed-air supply source 71, a flow sensor 72, a control part 73, and a table (setting table) 74.

The hydrogen gas supply source 63 is provided so as to be able to supply hydrogen gas from the first flow path 61 of the inspection line 60 to the test valve 2. This hydrogen gas is pressure-increased via the regulator 64 to, for example, on the order of 1.4 MPa, for supply to the pressurizing valve 66.

The supply pressure at this time is measured by the pressure sensor 65. The pressurizing valve 66, the open/close valve 67, and the exhaust valve 68 are provided so as to be ale to supply or exhaust hydrogen gas to or from the test valve 2 by their open/close operation at the time of valve-seat inspection and pressure-resistance inspection. The ventilation valve 69 is provided so as to discharge hydrogen gas in the second flow path 62 to ventilate also the inside of the exhaust valve 68. Between this ventilation valve 69 and the apparatus main body 1, the check valve 70 for backflow prevention is arranged. The compressed-air supply source 71 is provided so as to be able to supply compressed air to the ventilation valve 69. The flow sensor 72 is provided on a secondary side of the open/close valve 67, and can check the presence or absence of a relatively large valve-seat leak.

The control part 73 is formed of the CPU (central processing unit). This control part 73 and each of elements such as each of the sensors 23 and 24, each of the valves 66 to 70, the hydrogen gas supply source 63, and the compressed-air supply source 71 are electrically connected, and are provided so that operation of each part can be controlled by the control part 73. In the control part 73, the table (setting data) 74 set based on the nominal pressure, the nominal diameter, the valve type, and so forth of the test valve 2 is stored. Based on this table 74, operation of each part is controlled.

When a hydrogen leak from the test valve 2 occurs, outputs are made via a signal processing part in the control part 73 to a digital display part as a voltage in accordance with the concentration of hydrogen gas (not depicted). The digital display part has an LCD (liquid-crystal display), and output voltages of the respective sensors 23 and 24 are on indicator display on this LCD.

Next, a method for valve-seat inspection and pressure-resistance inspection on the test valve 2 formed of a globe valve by the inspection line 60 having the apparatus main body 1 depicted in FIG. 5 and the valve are described. The method for valve-seat inspection and pressure-resistance inspection for valves in the present embodiment is assumed to comply with, for example, each air pressure test in valve-seat leak inspection and valve-box pressure-resistance inspection defined in JIS B 2003 (General rules for inspection of valves).

Figure 7:
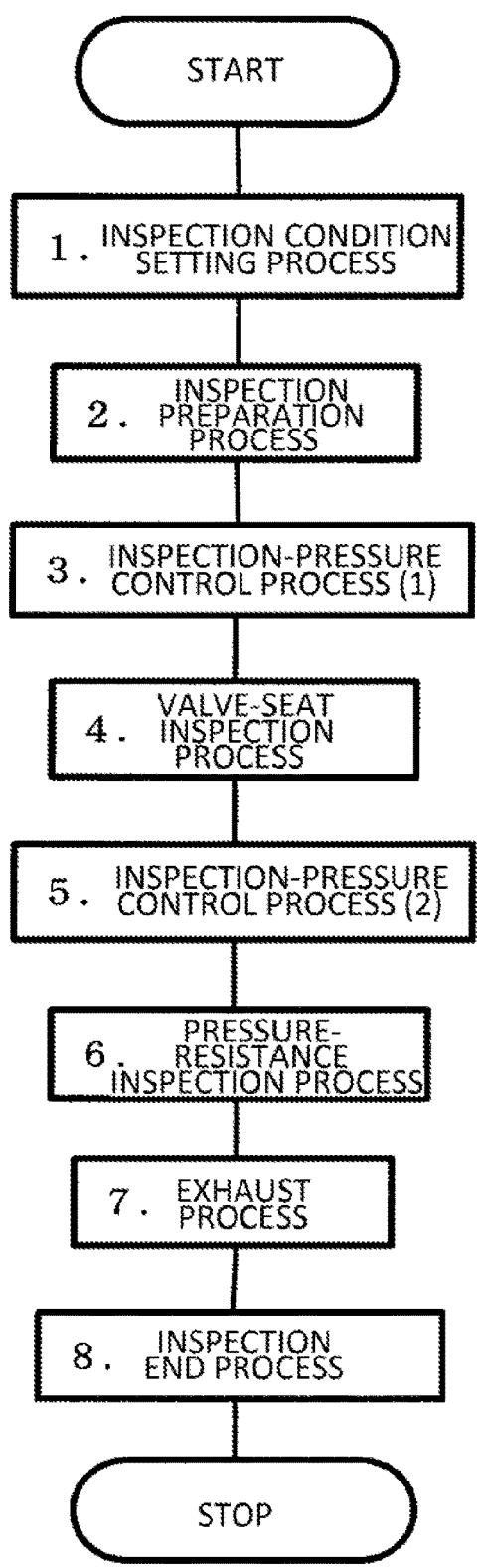
FIG. 7 is a flowchart depicting a process of inspection in a method for valve-seat inspection and pressure-resistance inspection for valves.

As processes in the present embodiment, as depicted in FIG. 7, provided are: 1. inspection condition setting process; 2. inspection preparation process; 3. inspection-pressure control process (1); 4. valve-seat inspection process; 5. inspection-pressure control process (2); 6. pressure-resistance inspection process; 7. exhaust process; and 8. inspection end process. In FIG. 8, the test valve 2 for use in the present embodiment and data contents in the table 74 are depicted.

In the inspection condition setting process, the specifications of the test valve 2 are selected or directly inputted by an input part, not depicted, such as a keyboard connected to the control part 73, thereby setting inspection conditions. The specifications of the test valve 2 include a nominal pressure, nominal diameter, valve type, product name, and so forth.

In the inspection preparation process, the process is performed through the following steps (1) to (7).

(1) When a switch, not depicted, of the control part 73 is turned ON to start automatic operation of the apparatus main body 1, based on the table 74 with the inspection conditions such as an inspection pressure and so forth inputted in advance, at least a pressure of hydrogen gas as search gas for use in a valve-seat inspection is set, and the pressure from the hydrogen gas supply source 63 is automatically adjusted via the regulator 64.

(2) Based on the table 74 in accordance with the class and size of the test valve 2, the elevating table 43 automatically ascends or descends with a predetermined movement amount, and its height is automatically adjusted. Here, for the test valve 2, a pressurizing force by the fixed clamp jig 32 and the movable clamp jig 33 is automatically set in advance. With this, at the time of clamping of the test valve 2, which will be described further below, an appropriate clamping force is exerted even under a condition of different pressures, and a decrease in durability of the seal member 52 is reduced.

(3) Based on the table 74, the tip bit of the nut runner 35 in accordance with the test valve 2 is automatically selected and is set to the apparatus main body 1.

(4) On the basis of the table 74, the elevating table 43 ascends and descends with a predetermined movement amount, and the heights of the primary and secondary flow path of the test valve 2 are aligned with the clamp 31. In this case, as depicted in FIG. 4(b), when the adjustment jigs 45 are provided to the mounting parts 44, the height position is finely adjusted by these adjustment jigs 45 even if the test valve 2 is of a small size, and the test valve 2 of a small class or size can also be reliably set at a predetermined height position.

(5) Here, manually by an operator or automatically, the test valve 2 is mounted on the placement jigs 42 of the mounting table 40 of the clamp mounting mechanism 21 automatically adjusted in (2). In this case, as depicted in FIG. 4(a), since the mounting part 44 of the placement jig 42 has a tapered shape, the test valve 2 is mounted in a stable state even if it has a side part of a different outer dimension and shape for each inspection.

The movable clamp jig 33 advances in a direction of nipping the test valve 2. By this movable clamp jig 33 and the fixed clamp jig 32, both end parts of the test valve 2 mounted on the mounting table 40 are clamped and fixed while automatically adjusted in accordance with their face-to-face spacing based on the table 74. Here, both ends of the test valve 2 are sealed by the gaskets 52, 52, causing a state in which the primary and secondary flow paths 56 and 51 of the clamp and the flow path 2a of the test valve 2 communicate each other.

Next, the chamber 20 advances to a fixed clamp jig 32 side. Inside this chamber 20 and the fixed clamp jig 32, the test valve 2 is accommodated. With these, the test valve 2 becomes in a state of being placed in the inspection space S.

With the above-described successive operation (5), the test valve 2 is attached at a predetermined position in the apparatus main body 1 to become in a state of allowing valve-seat inspection and pressure-resistance inspection.

(6) The nut runner 35 descends to cause its tip bit to become connected to the stem 12 of the test valve 2, thereby causing the test valve 2 to be operated to become in a valve-close state.

(7) The reference voltages of the gas sensor for valve-seat inspection 23 and the gas sensors for pressure-resistance inspection 24 are adjusted, and a voltage capable of detecting hydrogen is set with respect to these adjusted reference voltages. In this case, the reference voltage is individually adjusted for each of the gas sensors 23 and 24, or all sensors 23 and 24 are adjusted to have a fixed reference voltage.

The above-described inspection preparation process from (1) to (7) similarly functions not only when the test valve 2 is a valve of one type but also when, for example, a gate valve and a ball valve in addition to a globe valve are successively inspected on the inspection line 60. In accordance with the specifications of each test valve 2, it is set at a predetermined position in the apparatus main body 1. In this case, the specifications of each test valve 2 are inputted in advance in the above-described inspection condition setting process.

In the inspection-pressure control processes, based on the table 74 in accordance with the type, class, or size of a globe valve, a gate valve, or the like as the test valve 2, inspection pressures for valve-seat inspection and pressure-resistance inspection are set. The inspection-pressure control processes are performed as an inspection-pressure control process (1) and an inspection-pressure control process (2) before a valve-seat inspection process and a pressure inspection process are performed, respectively.

In the valve-seat inspection process, search gas is supplied to the test valve 2 with the predetermined inspection pressure (for example, 0.6 MPa) set via the inspection-pressure control process (1), and the presence or absence of a leak from the valve seat 16 in a valve-close state of this test valve 2 is detected. In more detail, the process is performed in accordance with the following steps (1) to (8).

(1) The exhaust valve 68 is set in a closed state, and an exhaust path 75 provided as being branched to the first flow path 61 to the test valve 2 becomes in a state of being closed.

(2) The pressurizing valve 66 is set in an open state, and hydrogen gas from the hydrogen gas supply source 63 is supplied to the primary side of the test valve 2.

(3) By the pressure sensor 65, it is confirmed that hydrogen gas supplied to the test valve 2 has reached the predetermined valve-seat inspection pressure.

(4) The pressurizing valve 66 undergoes closing operation, and hydrogen gas is charged inside the primary side of the test valve 2.

(5) The open/close valve 67 of the second flow path 62 is set in an open state, and the presence or absence of a large valve-seat leak is checked by the flow sensor 72.

(6) The open/close valve 67 is operated to become in a closed state.

(7) The protective shutter 25 is operated to become in an open state, a predetermined time elapses and, after hydrogen gas becomes stable in a state suitable for valve-seat inspection, the presence or absence of a valve-seat leak is checked by the gas sensor for valve-seat inspection 23.

(8) The shutter 25 is set in a closed state, preventing transmission of the inspection pressure to the gas sensor for valve-seat inspection 23.

In the above-described valve-seat inspection process, the valve-seat inspection is performed by the steps (3), (5), and (7), and the gas sensor 23 for valve-seat inspection 23 is protected by the steps (3) and (5). Here, as a shutdown mechanism, a changeover valve not depicted may be used in place of the shutter 25. In this case, to prevent immersion of superfluous sensor gas, a valve without a cavity such as, for example, butterfly valve, is suitably used as a changeover valve.

In the pressure-resistance inspection process, search gas is supplied to the test valve 2 accommodated in the inspection space S of the chamber 20 of which volumetric capacity can be adjusted via the inspection-pressure control process (2), and a leak of the search gas diffused from the test valve 2 is detected. In more detail, the process is performed in accordance with the following steps (1) to (6).

(1) By the nut runner 35, the test valve 2 is operated to a half-open state.

(2) By operation of the regulator 64, the hydrogen gas used in the valve-seat inspection process is pressure-increased to a predetermined pressure-resistance inspection pressure (for example, 1.4 MPa). The hydrogen gas supply source 63 may be provided for valve-seat inspection and for pressure-resistance inspection, separately.

(3) By opening operation of the pressurizing valve 66, the hydrogen gas after the pressure increase is supplied to the test valve 2.

(4) By the pressure sensor 65, it is confirmed that hydrogen gas supplied to the test valve 2 has reached the predetermined pressure-resistance inspection pressure.

(5) By closing operation of the pressurizing valve 66, hydrogen gas is charged inside the test valve 2.

(6) After a predetermined time has elapsed, in a state in which hydrogen gas is stabilized in a state suitable for pressure-resistance inspection, the presence or absence of a leak is checked through the pressure-resistance inspection by six pressure-resistance inspection sensors 24.

In the above-described pressure-resistance inspection process, the pressure-resistance inspection is performed by the steps (4) and (6).

In the exhaust process, an exhaust is performed through the following steps (1) and (2).

(1) By opening operation of the exhaust valve 68, the exhaust path 75 is opened, and hydrogen gas is exhausted from the inside of plumbing (inspection line 60) including the test valve 2.

(2) By opening operation of the ventilation valve 69, ventilation air is supplied from the compressed-air supply source 71 via the secondary flow path, and hydrogen gas is forcibly exhausted from the inspection line 60 including the test valve 2.

In the inspection end process, operation is performed by in accordance with the following steps (1) to (4).

(1) By operation of the nut runner 35, the test valve 2 is set in a valve-close state.

(2) The chamber 20 is operated to be open in an open state.

(3) The clamp 31 is removed from the test valve 2, and the state becomes such that automatic operation of the apparatus main body 1 ends.

(4) The test valve 2 is taken out as being lifted from the apparatus main body 1.

With the above, the valve-seat inspection and the pressure-resistance inspection on the test valve 2 formed of a globe valve are completed.

Figure 6:
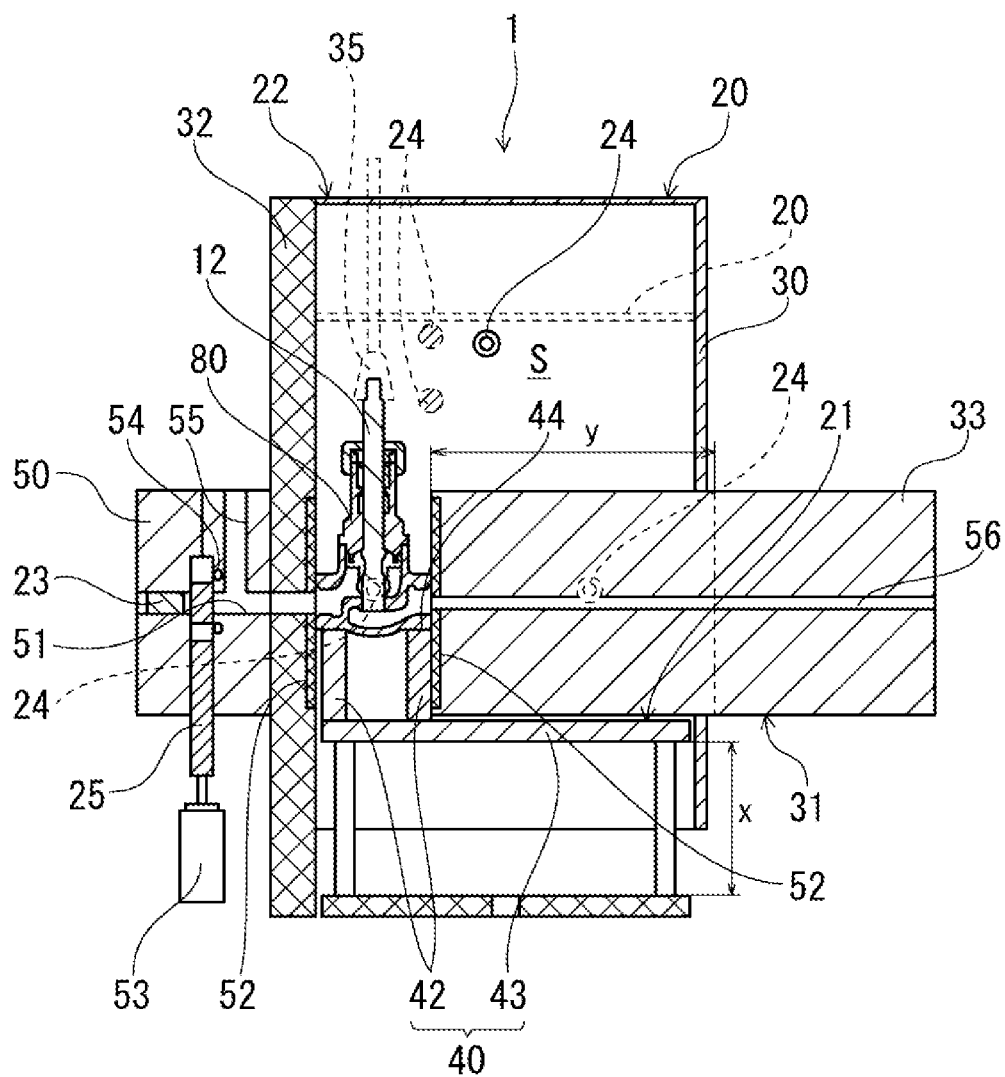
FIG. 6 is a schematic longitudinal sectional view depicting a state in which a small valve is attached to the apparatus for valve-seat inspection and pressure-resistance inspection for valves.

In FIG. 6, depicted is a state in which the test valve 80 that is different from the above-described test valve 2 is attached to the apparatus main body 1. Specifically, depicted is an example of a test valve of a valve type identical to that of FIG. 1 and having a nominal pressure of 10 K and a nominal diameter of ¼B. In this manner, even in the case of the test valve 80 formed of a small-sized globe valve, valve-seat inspection and pressure-resistance inspection can be performed through each of the above-described processes.

In this case, particularly in the step (4) of the inspection preparation process, when the test valve 80 is mounted on the mounting table 40, a space between two placement jigs 42 is adjusted in accordance with the face-to-face dimension of the test valve 80, causing the test valve 80 to be reliably mounted on these placement jigs 42, 42 and held by the tapered-shaped mounting parts 44 in a state of being not tilted or wobbled.

In the step (4) of the inspection preparation process, the mounting table 40 ascends or descends in accordance with the test valve 80, the height positions of the primary and secondary flow paths of this test valve 80 are aligned with the height of the clamp 31, and the movable clamp jig 33 advances in a direction of nipping the test valve 80 to cause both end parts of the test valve 80 to be clamped thereby and the fixed clamp jig 32 in a state of being sealed by the gaskets 52.

Here, correspondingly to the face-to-face dimension of the test valve 80, a movement amount y of the movable clamp jig 33 is set on the basis of the table 74, and the test valve 80 is clamped by a pressurizing force F. In this manner, in this embodiment, the inspection space S is set to be fixed by a height x of the elevating table 43 and the movement amount y (amount of insertion into the chamber 20) of the movable clamp jig 33.

By moving the chamber 20 down to a state indicated by broken lines in the drawing, moving only a top plate part of the chamber 20 down, or moving a side surface, the volumetric capacity of the inspection space S formed by this chamber 20 and the fixed clamp jig 32 may be substantially fixed. In this manner, even in the case of the small-sized test valve 80, it is attached inside the apparatus main body 1 in an appropriate state to allow valve-seat inspection and pressure-resistance inspection to be performed. The gas sensors for pressure-resistance inspection 24 may be provided at positions indicated by hatching in the chamber 20. In this case, with these sensors 24 close to the test valve 80, leaking search gas can be sensed more quickly.

Next, operation in the above-described embodiment of the apparatus for valve-seat inspection and pressure-resistance inspection for valves of the present invention is described.

The apparatus for valve-seat inspection and pressure-resistance inspection for valves of the present invention can successively perform a valve-seat inspection and a pressure-resistance inspection on the globe valve 2 as a test valve by a single apparatus main body 1; includes the clamp mounting mechanism 21, the inspection space adjustment mechanism 22, the gas sensor for valve-seat inspection 23, and the gas sensors for pressure-resistance inspection 24; and adjusts the volumetric capacity of the inspection space S of the chamber 20 by the inspection space adjustment mechanism 22 while clamping the test valve 2 at a predetermined inspectable position by the clamp mounting mechanism 21 even if a type, class, or size of the test valve 2 is varied, so that the time for detecting hydrogen gas is substantially fixed. Thus, the time required for inspection can be shortened, and a valve-seat inspection and a pressure-resistance inspection can be successively performed on valves of different specifications in a short time. With successive inspections, the search gas used in the valve-seat inspection can be utilized for the pressure-resistance inspection without being exhausted, and the amount of consumption of the search gas can be reduced.

At the time of valve-seat inspection, until supply of that inspection pressure is completed, the gas sensor for valve-seat inspection 23 is protected by the shutter 25, preventing an abrupt pressure from being applied to the gas sensor for valve-seat inspection 23. With this, even in case that a large leak occurs from the valve seat 16, a significant voltage drop and damage of the sensor 23 are prevented. Thus, even if a solid state type gas sensor is used as the sensor 23, poisoning is prevented to prevent a decrease in sensitivity and damage of the sensor. By this solid state type gas sensor, sensing can be made with high sensitivity even in the case of low-concentration search gas, and long-life inspection excellent in stability can be performed.

Figure 10:
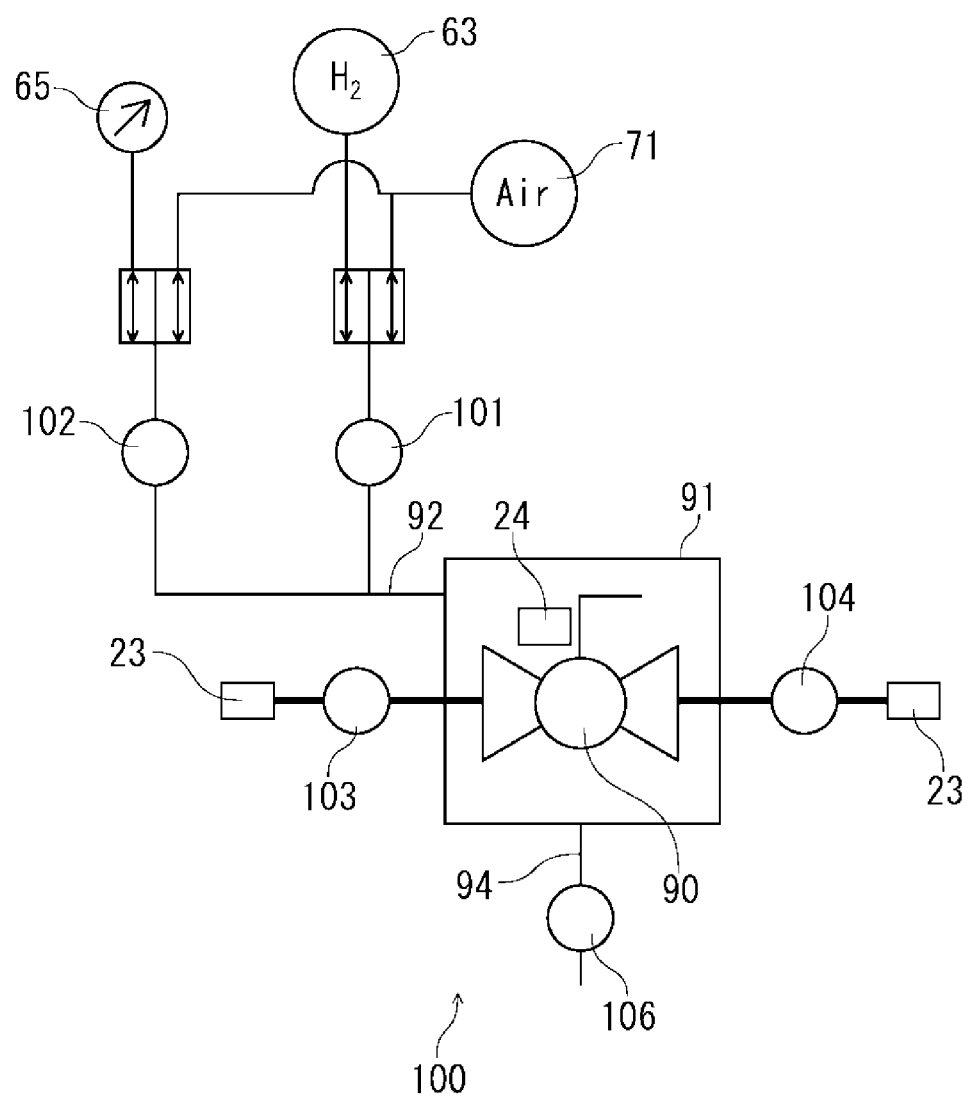
FIG. 10 is a block diagram depicting an inspection line for a ball valve.

In FIG. 9, depicted is a second embodiment of the apparatus for valve-seat inspection and pressure-resistance inspection for valves of the present invention, a schematic longitudinal sectional view of an apparatus main body when the test valve is a ball valve. In FIG. 10, depicted is a block diagram of an inspection line for ball valves. In this embodiment onward, a portion identical to that of the above-described embodiment is represented with the same reference character, and description of this portion is omitted.

In this embodiment, a ball valve with valve seats 95 provided at two locations on primary and secondary sides is used as a test valve 90, and this test valve 90 is attached to an apparatus main body 91 for each inspection. In this case, the shutdown mechanisms (shutters) 25 are respectively provided on the primary and secondary sides of the ball valve 90. By shutting down the primary and secondary sides by the respective shutdown mechanisms 25, 25, a valve-seat inspection and a pressure-resistance inspection on each seal side can be performed. In FIG. 9, a mounting table is omitted.

When the test valve 90 is a ball valve, after injection of hydrogen gas with at an intermediate degree of opening, the test valve 90 is operated to become in a full-close state, and hydrogen gas (search gas) is charged into a cavity C. Then, in preparation for valve-seat inspection, hydrogen gas in primary and secondary plumbing of the test valve 90 is exhausted, and the presence or absence of a valve-seat leak is checked by using the gas sensors for valve-seat inspection 23, 23 respectively provided on the primary and secondary sides.

In this embodiment, a supply flow path 92 is provided to the apparatus main body 91. This supply flow path 92 is branched midway to be connected to the primary and secondary sides of the apparatus main body 91, respectively. The supply flow path 92 is provided with a changeover valve 93 for three-direction switching. To a branched portion of this changeover valve 93, an exhaust flow path 94 is connected. By flow-path switching by the changeover valve 93, it is provided so that hydrogen gas or purge gas from the supply flow path 92 can be supplied to the test valve 90, or gas inside the test valve 90 is exhausted via the exhaust flow path 94.

Figure 11:
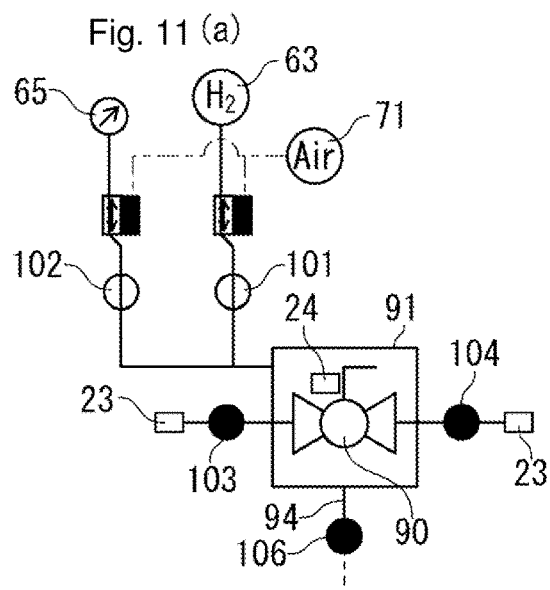
FIG. 11 is a block diagram depicting each process in the inspection line of FIG. 10.
Figure 11:
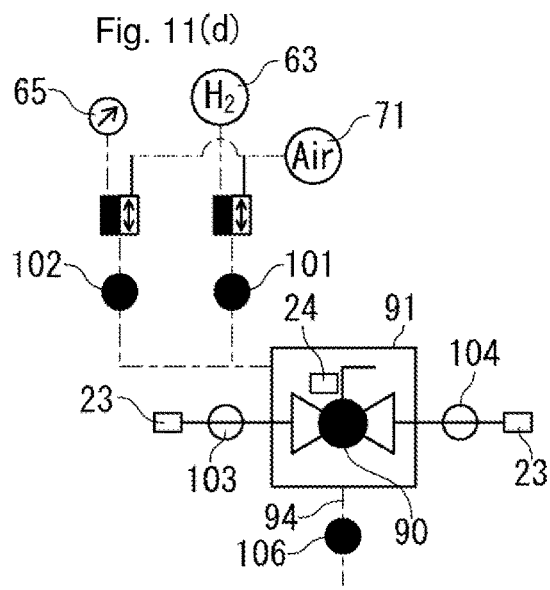
Figure 11:
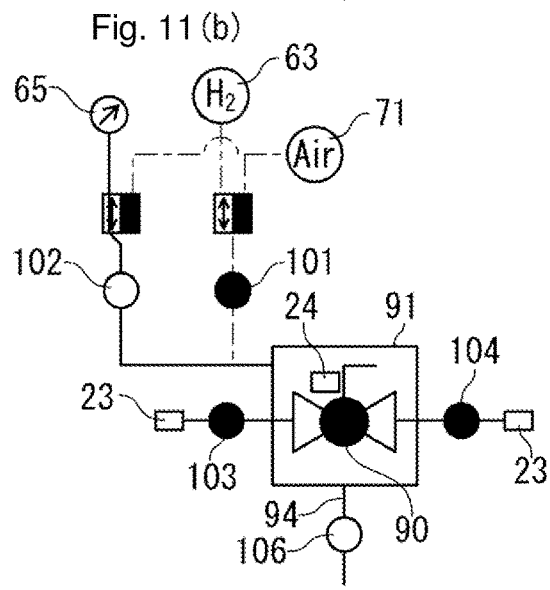
Figure 11:
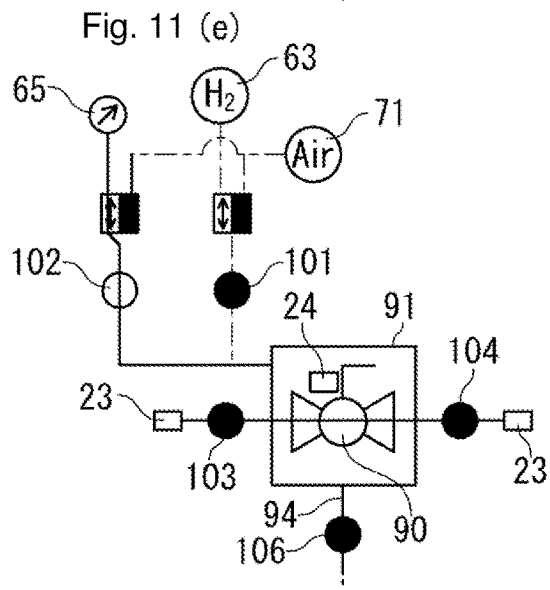
Figure 11:
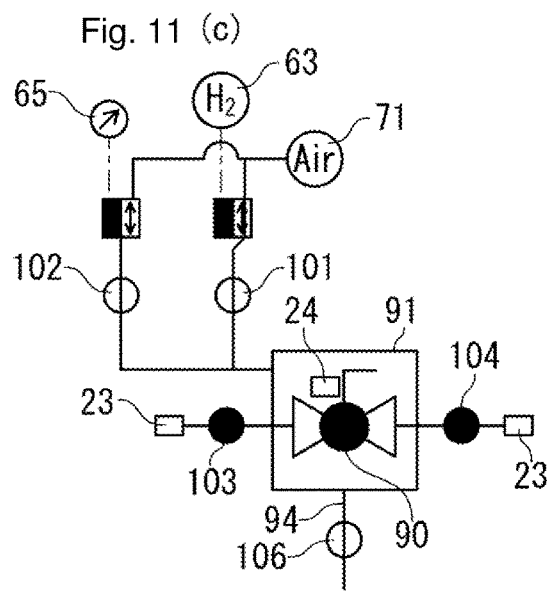

A method for valve-seat inspection and pressure-resistance inspection on the ball valve 90 by an inspection line 100 using this apparatus main body 91 is described in detail by using block diagrams depicted in FIG. 10 and FIG. 11.

In the inspection line 100 depicted in FIG. 10, the supply flow path 92 to the apparatus main body 91 is provided with the hydrogen gas supply source 63, the compressed-air supply source 71, the pressure sensor 65, and solenoid valves 101 and 102, and these are connected as depicted in the drawing. Provided on primary and secondary sides of the test valve 90 are solenoid valves 103 and 104, respectively, each connected to the shutter 25 and the cylinder 53 for opening and closing the shutter 25 of FIG. 9, and also provided each is the gas sensor for valve-seat inspection 23 in a state of being shut down by the shutter 25. Furthermore, the apparatus main body 91 is provided with the exhaust flow path 94, and this exhaust flow path 94 is provided with an exhaust valve 106.

In FIG. 11, depicted are respective steps of inspection, and an inspection is performed in the order of FIG. 11(a) to FIG. 11(e). In the drawings, it is depicted that a flow path indicated by a solid line is in a communication state and a flow path indicated by a one-dot-chain line is in a close state. In the test valve 90 and each of the solenoid valves 101 to 104, a hollow dot indicates an open state of the flow path, and a dot filled in with black indicates a close state. Although not depicted, in an initial state of the inspection line 100, only the exhaust valve 106 is in an open state. Before inspection, the gas sensors for pressure-resistance inspection 24 are set to be zero-adjusted.

FIG. 11(a) depicts a state in which the test valve 90 attached to the apparatus main body 91 is pressurized by hydrogen gas. In this case, the exhaust valve 106 is set in a close state, and the solenoid valve 101 to which the hydrogen gas supply source 63 is connected is set in an open state. From both of the primary and secondary sides of the test valve 90, hydrogen gas is applied to the ball valve in a state with the intermediate degree of opening. Here, as with the solenoid valve 101, the solenoid valve 102 is also set in an open state, and the pressure of hydrogen gas from the hydrogen gas supply source 63 can be checked by the pressure sensor 65.

FIG. 11(b) depicts an exhaust state of the apparatus main body 91. In this case, the solenoid valve 101 is operated to be in a close state, ending supply of hydrogen gas to the test valve 90 from the hydrogen gas supply source 63. The exhaust valve 106 is operated to be in an open state, and hydrogen gas is exhausted from plumbing on the primary and secondary sides of the test valve 90 in a valve-close state.

FIG. 11(c) depicts a state in which the apparatus main body 91 is air-purged. Here, purge air is supplied from the compressed-air supply source 71, and hydrogen gas is exhausted from both of the primary and secondary sides of the test valve 90. This exhaust is desirably performed on the order of forty seconds.

The processes in FIG. 11(b) and FIG. 11(c) are requisite for performing quick, accurate valve-seat inspection, particularly when the test valve 90 is a ball valve.

From this state, the solenoid valve 101 is operated to be in a close state, ending supply of purge air. Here, the exhaust valve 106 is set to maintain the open state for a while. This is because, if the exhaust valve 106 is set to be in a closed state simultaneously with closing operation of the solenoid valve 101, the pressure in the inspection line 100 tends to become unstable, making it difficult to perform accurate inspection. If the exhaust flow path 94 is closed with slight delay, inspection can be performed accurately. When the exhaust valve 106 is operated to be closed, zero-adjustment of the gas sensors 23 for valve-seat inspection is performed.

FIG. 11(d) depicts a state of circuitry when valve-seat inspection is performed. In this case, the solenoid valve 103 and the solenoid valve 104 on the primary and secondary sides, respectively, of the test valve 90, are operated to be in an open state. By driving the cylinder 53 to open the shutter 25, a passage to each gas sensor for valve-seat inspection 23 is opened, and valve-seat inspections on both of the primary and secondary sides of the test valve 90 are performed.

FIG. 11(e) depicts a state of circuitry when pressure-resistance inspection is performed. In this case, the solenoid valve 103 and the solenoid valve 104 are each operated to be in a close state, and the cylinder 53 is driven to close the shutter 25. Also, the solenoid valve 102 is set to be in an open state to cause the test valve 90 and the pressure sensor 65 to become in a connected state.

The test valve 90 is operated to be in a full-open state, hydrogen gas in the cavity C is open in the inspection line 100, and a residual pressure valve of hydrogen gas in the cavity C is checked. Here, if the residual pressure value exceeds a set value defined in advance, this means that the valve-seat inspection has been correctly performed.

As for pressure-resistance inspection, this inspection is performed by using a hydrogen sensor, not depicted, arranged so as to be positioned near a gland part 90a of the test valve 90 in the chamber 20.

After the end of all inspections, the exhaust valve 106 is operated to be in an open state, and hydrogen gas in the inspection line 100 is exhausted. As required, the solenoid valve 101 may also be set to be in an open state, and purge air may be supplied from the compressed-air supply source 71 into the inspection line 100 to perform a forcible exhaust.

As described above, even in the case of a test valve having a structure provided with the valve seats 95, 95 at two locations on the primary and secondary sides as the ball valve 90, it is possible to perform an inspection of a leak in each valve seat 95 and then a pressure-resistance inspection. As with the case of a valve having a structure provided with a valve seat at one inner location as a globe valve or gate valve, inspection can be performed quickly in a substantially fixed time even for ball valves of different classes and sizes.

Figure 12:
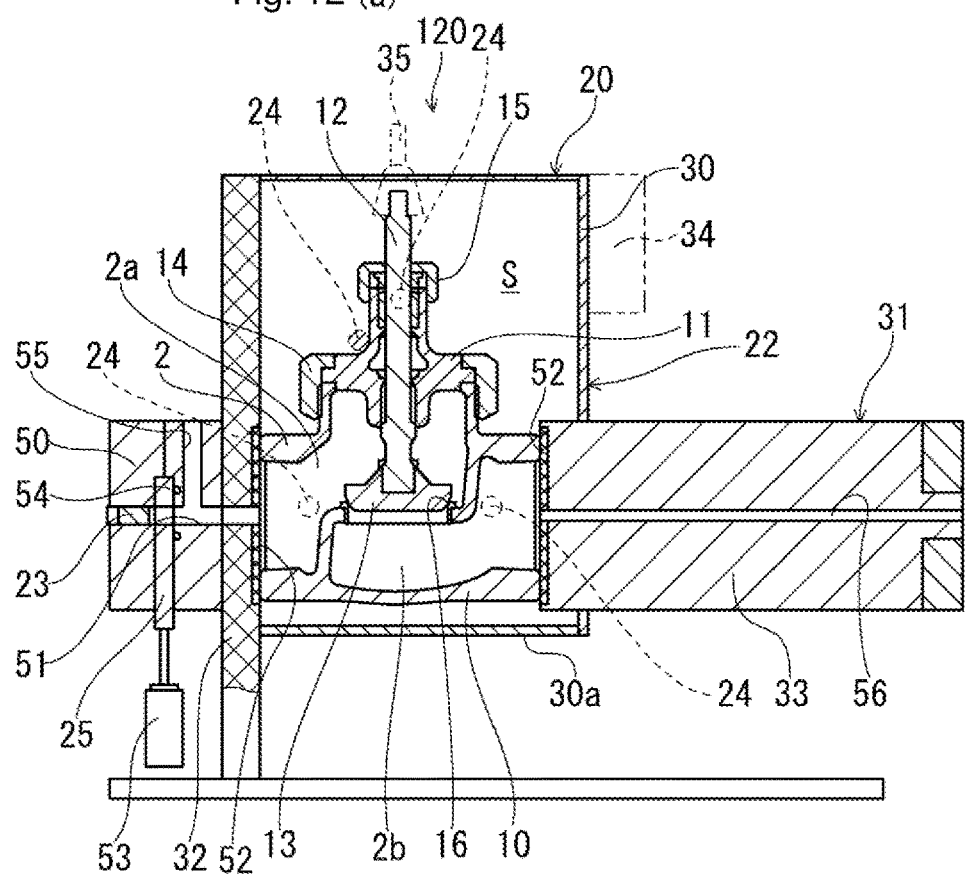
In FIG. 12(*a*) is a schematic longitudinal sectional view depicting a third embodiment of the apparatus for valve-seat inspection and pressure-resistance inspection for valves of the present invention and FIG. 12(*b*) is a schematic longitudinal sectional view depicting a fourth embodiment of the apparatus for valve-seat inspection and pressure-resistance inspection for valves of the present invention.

In FIG. 12(a), depicted is a third embodiment of the apparatus for valve-seat inspection and pressure-resistance inspection for valves of the present invention.

In an apparatus main body 120 in this embodiment, the mounting table 40 having the placement jigs 42 and the elevating table 43 in the embodiment of FIG. 1 described above is omitted, and the test valve 2 formed of a globe valve is nipped from both sides by the clamp 31 having the fixed clamp jig 32 and the movable clamp jig 33, thereby being mounted in the chamber 20.

In this manner, a mounting table is not necessarily required. By providing at least the clamp 31, the test valve 2 is arranged in a sealed state by the clamp 31 between the primary flow path 56 and the secondary flow path 51 to allow a valve-seat inspection and a pressure-resistance inspection to be performed.

In this case, as depicted in the drawing, a bottom plate 30a is provided to a lower part of the cover part 30, and a lower part of the test valve 2 is covered with this bottom plate 30a. The bottom plate 30a is designed so as to be close to the movable clamp jig 3 as much as possible. With the lower part of the cover part 30 covered with this bottom plate 30a, an influence of disturbance is less prone to be exerted. With this, the valve-seat inspection and the pressure-resistance inspection can be performed with high accuracy.

At the time of valve-seat inspection and pressure-resistance inspection, even when the valve size of the test valve 2 is large, unlike the case of using a mounting table, it is not required to moving the lower part of the chamber 20. Thus, the inspection time can be shortened. By omitting a mounting table, space saving of the entire apparatus main body 120 can also be achieved.

Figure 12B:
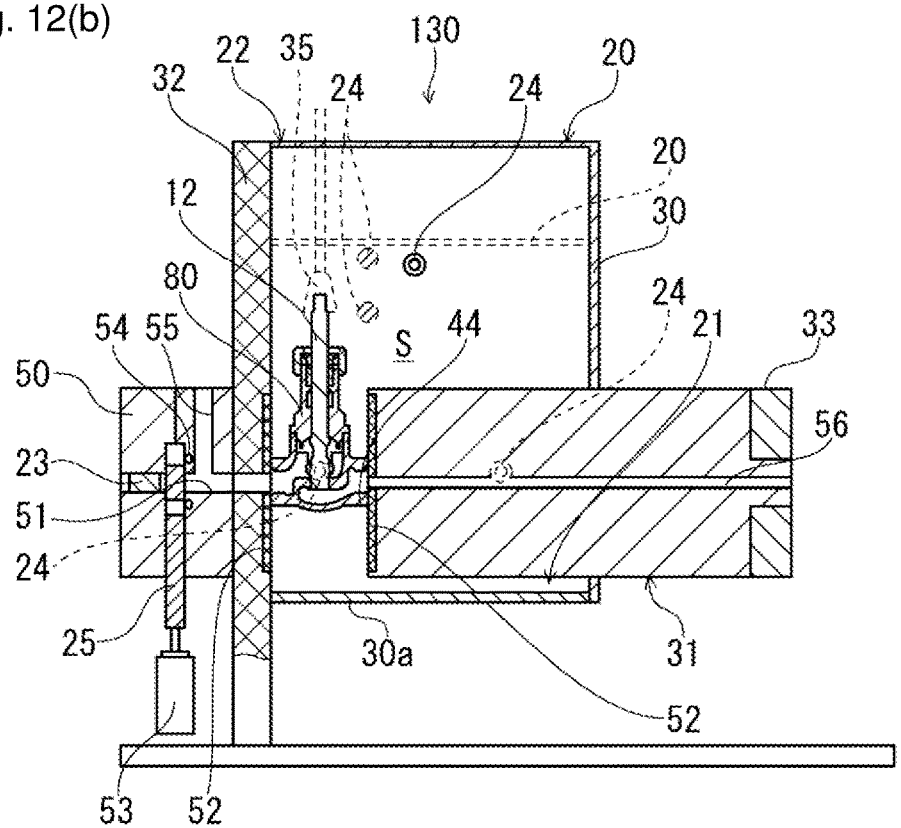

In FIG. 12(b), depicted is a fourth embodiment of the apparatus for valve-seat inspection and pressure-resistance inspection for valves of the present invention.

In an apparatus main body 130 in this embodiment, sides in the apparatus main body 120 of FIG. 12(a) described above, a test valve 80 formed of a small-sized globe valve is nipped from both sides and held in the chamber 20. Also in this case, as with the case of holding the test valve 2 of FIG. 12(a), valve-seat inspection and pressure-resistance inspection can be performed in a state in which the test valve 80 is reliably fixed by the clamp 31.

In the case of the apparatus main body 120 of FIG. 12(a) described above, when the valve size (valve diameter) of the test valve 2 is, for example, two inches, the nipping pressure by the clamp 31 is preferably set on the order of 0.3 MPa. On the other hand, in the case of the apparatus main body 130 of FIG. 12(b), when the valve size of the test valve 80 is, for example, ¼ inches, the nipping pressure by the clamp 31 is preferably decreased to the order of 0.1 MPa. With these, an end face of each of the test valves 2, 80 on a flow path side is nipped by the seal member 52 with a large diameter with respect to the end face without application of a local pressure. Also for the test valve 80 with an end face on a flow path side smaller than the seal member 52, local deformation of the seal member 52 and deformation of the test valve 80 itself are prevented. Both end faces are held by the seal members 52 in a pressure-equalized state to bring about a centered state, and a deviation between the secondary flow path 51 and the primary flow path 56 is inhibited to prevent a leak. In this state, each inspection can be performed.

In either of the above-described FIG. 12(a) and FIG. 12(b), for example, the test valve 2, 80 may be arranged so as to be opposed to the secondary flow path 51 by a robot or handing tool, not depicted, with the nut runner 35 arranged at a depicted position, and then the movable clamp jig 33 may be caused to advance into the inspection chamber 20, thereby nipping the test valve 2, 80 between the fixed clamp jig 32 and the movable clamp jig 33 in a so-called hanging-in-midair state. Also in the case of this hanging-in-midair state, functions similar to those in the case of using a mounting table can be exerted to fix and clamp the test valve 2, 80 in the inspection chamber 20. Then, the test valve 2, 80 is covered with the cover part 30 or the bottom plate 30a to form the above-described inspection space S.

While the embodiments of the present invention have been described in detail, the present invention is not limited to the description of the above embodiments, but can be variously changed in a range not deviating from the spirit of the invention described in the claims of the present invention. For example, the present invention can be applied also to valves other than a globe valve, a gate valve, and a ball valve, and may be applied to plumbing equipment and various pressure vessels other than the valves.

REFERENCE SIGNS LIST 1, 91, 120, 130 apparatus main body
2, 80, 90 sample valve
2a flow path
16, 95 valve seat
20 chamber
21 clamp mounting mechanism
22 inspection space adjustment mechanism
23 gas sensor for valve-seat inspection
24 gas sensor for pressure-resistance inspection
25 shutter (shutdown mechanism)
31 clamp
40 mounting table
C cavity
S inspection space

The invention claimed is:

1. An apparatus for valve-seat inspection and pressure-resistance inspection for valves allowing a valve-seat leak and pressure-resistance inspection of a test valve, the apparatus comprising;
   a fixed clamp jig for fixing one side of the test valve; and
   a movable clamp jig configured to freely advance and retract relative to the fixed clamp jig, the movable clamp jig being operable to fix another side of the test valve;
   a cover part for covering the test valve with an open lower side; and
   a plurality of gas sensors fixedly attached inside the cover part, wherein the fixed clamp jig and the cover part configure a chamber in a non-hermetically-sealed state in a state in which the cover part is moved to a fixed clamp jig side, the movable clamp jig is inserted into the chamber in accordance with a volume of the test valve, it is provided that a volumetric capacity of an inspection space of the chamber is adjusted to be substantially fixed by an insertion depth of the movable clamp jig and the volume of the test valve in accordance with the volume of the test valve, the inspection space of the test valve is provided inside the chamber in the non-hermetically-sealed state, and search gas diffuses in the cover part with the test valve being in the non-hermetically-sealed state separated from outside.

2. The apparatus for valve-seat inspection and pressure-resistance inspection for valves according to claim 1, wherein a mounting table is provided on a lower side of the chamber, and the volumetric capacity of the inspection space of the chamber can be adjusted by ascending and descending the mounting table.

3. The apparatus for valve-seat inspection and pressure-resistance inspection for valves according to claim 2, wherein the test valve is a valve including a globe valve or a gate valve.

4. The apparatus for valve-seat inspection and pressure-resistance inspection for valves according to claim 1, comprising a shutdown mechanism for shutting a flow path to a gas sensor down at the valve-seat inspection until supply of an inspection pressure is completed, the gas sensor provided to a secondary flow path of the test valve.

5. The apparatus for valve-seat inspection and pressure-resistance inspection for valves according to claim 4, wherein the test valve is a valve including a globe valve or a gate valve.

6. The apparatus for valve-seat inspection and pressure-resistance inspection for valves according to claim 1, wherein the test valve is a valve including a globe valve or a gate valve.

7. The apparatus for valve-seat inspection and pressure-resistance inspection for valves according to claim 1, wherein the search gas is a mixed gas of hydrogen and nitrogen formed of a gas containing hydrogen.

8. The apparatus for valve-seat inspection and pressure-resistance inspection for valves according to claim 1, wherein when the test valve is a ball valve, after the search gas is injected into the ball valve at a state of an intermediate degree of opening, the search gas is charged into a cavity of the ball valve with the ball valve being in a full-close state and, in preparation for the valve-seat inspection, the search gas in primary and secondary plumbing of the ball valve is exhausted.

* * * * *